United States Patent [19]

Raszkowski

[11] Patent Number: 5,425,688
[45] Date of Patent: Jun. 20, 1995

[54] HYDRAULIC FORWARD/REVERSE SHIFT FORK CONTROL FOR A POWER TRANSMISSION

[75] Inventor: James A. Raszkowski, Indianapolis, Ind.

[73] Assignee: General Motors Corporation, Detroit, Mich.

[21] Appl. No.: 104,967

[22] Filed: Aug. 10, 1993

[51] Int. Cl.⁶ ............................................. B60K 41/06
[52] U.S. Cl. ..................................... 477/117; 74/347; 477/116; 477/127
[58] Field of Search ............... 477/116, 117, 127, 128, 477/129, 130, 131; 74/336 R, 346

[56] References Cited

U.S. PATENT DOCUMENTS

| | | |
|---|---|---|
| 2,719,436 | 10/1955 | Nallinger .............................. 477/129 |
| 3,688,607 | 9/1972 | Marlow ................................ 477/129 |
| 4,290,325 | 9/1981 | Nishimura ........................... 477/116 |
| 4,616,531 | 10/1986 | Ogasawara et al. ................. 477/116 |
| 5,179,874 | 1/1993 | Hunter ............................ 477/131 X |
| 5,233,878 | 8/1993 | Klemen et al. ........................ 74/346 |

Primary Examiner—Charles A. Marmor
Assistant Examiner—Peter Kwon
Attorney, Agent, or Firm—Donald F. Scherer

[57] ABSTRACT

A shift fork for a forward-reverse shift mechanism has a hydraulic piston portion for moving the shift fork. The piston is controlled by a hydraulic valve system. The valve system is effective to delay the engagement of the respective forward and reverse, hydraulically-operated, torque transfer devices. The shift fork will enforce the establishment of the proper power path through a synchronizer prior to the engagement of the torque transfer control devices.

21 Claims, 7 Drawing Sheets

HYDRAULIC FORWARD/REVERSE SHIFT FORK CONTROL FOR A POWER TRANSMISSION

TECHNICAL FIELD

The present invention relates generally to controls for power transmissions. More particularly, the present invention relates to controls for countershaft-type transmissions having a synchronizer by which to establish forward and reverse power paths. Specifically the present invention relates to hydraulic controls for actuating a shift fork operatively associated with the synchronizer and for actuating hydraulically engageable torque transfer devices in the nature of friction clutches or brakes.

BACKGROUND OF THE INVENTION

The use of a hydraulic piston to control the position of a synchronizer sleeve is well known. A representative system of that type is shown in U.S. Pat. No. 5,233,878, issued on Aug. 10, 1993, in the name of Klemen et al and assigned to the assignee of the present invention. These systems have a double acting piston which is pressurized to translate a shift fork to predetermined operating positions. The shift fork is operatively connected with a synchronizer which, in combination with fluid-operated torque control devices, generally in the nature of clutches or brakes, establishes two distinct power paths in a countershaft transmission such as that shown in U.S. Pat. No. 5,009,116 issued Apr. 23, 1991. In the above denoted patents, a hydraulically-operated shift fork controls positioning of the forward-reverse synchronizer. When the synchronizer has been positioned, the power path in the transmission is completed by engaging the appropriate fluid-operated torque transfer device.

When shifting from a forward drive condition to a park condition, the manual valve passes through the neutral and reverse conditions. When this maneuver is made quickly, the condition effected by the neutral condition interrupts the pressure to the forward drive solenoid so that the forward torque transfer device is released and the transfer of torque to the power transmission ceases. As the manual valve is moved through the reverse condition the solenoid emits a pressure pulse that energizes the reverse torque transfer device before the solenoid is electronically disengaged. The torque transfer device completes the power path, and the drive train begins to rotate to accommodate the tolerances in the system. The gears, including the park gear, can be rotating to a sufficient degree that engagement of the park pawl with the park gear produces some noise while ratcheting into position—a result which the operator may find objectionable. While the successive conditions effected by the aforesaid movement of the manual valve fairly rapidly through the neutral and reverse conditions in order to reach the park condition do not damage the power transmission at the low torque and speed conditions involved, the resulting noise is undesirable.

SUMMARY OF THE INVENTION

It is therefore a primary object of the present invention to provide an improved transmission control wherein manipulation of the manual valve from forward drive through neutral and/or reverse is accompanied by a delay of fluid delivery to the power transmission torque transfer control solenoids.

It is another object of the present invention to provide an improved transmission control, as above, wherein a forward-to-reverse shift actuates a shift fork control mechanism that interposes a unique fluid flow between the manual valve and the torque transfer control solenoids prior to the selected positioning of the shift fork.

It is a further object of the present invention to provide an improved transmission control, as above, wherein a flow control valve means is interposed between the manual valve and the torque transfer control solenoids in order to effect the desired delay to the actuation of the torque transfer control solenoids These and other objects of the invention, as well as the advantages thereof over existing and prior art forms, which will be apparent in view of the following detailed specification, are accomplished by means hereinafter described and claimed.

In general, a shift fork control embodying the concepts of the present invention eliminates re-engagement of the torque transfer devices in a transmission during normal movement of the manual valve to the park condition. A fluid connection that incorporates a unique flow control valve arrangement is interposed between the manual valve fork control and the torque transfer control solenoids that precludes the flow of fluid to the torque transfer control solenoids until the shift fork position has been established.

The shift fork control rail is moved to the forward or reverse condition by a double acting piston which is disconnected from the pressure source after the required position is reached. The flow control valves contribute to this resulting function.

The present invention is contemplated to have particular usefulness in conjunction with a manual valve that passes through the reverse condition in a drive-to-park shift. Prior to the torque transfer control solenoid valves being connected to the pressure source, the piston in the shift fork controller must be properly pressurized. That is, the rod-like, shift fork control rail must be positioned to deliver fluid to the proper flow control valve before the source of fluid pressure can be connected through that flow control valve to the torque transfer control solenoids. This action provides sufficient delay to prevent pressure engagement of the fluid-operated, reverse torque transfer device in the power transmission when the movement of the manual valve is continued fairly rapidly through the reverse condition to the park condition.

To acquaint persons skilled in the arts most closely related to the present invention, one preferred embodiment of a transmission shift fork control that illustrates a best mode now contemplated for putting the invention into practice is described herein by, and with reference to, the annexed drawings that form a part of the specification. The exemplary shift fork control mechanism is described in detail without attempting to show all of the various forms and modification in which the invention might be embodied. As such, the embodiment shown and described herein is illustrative, and, as will become apparent to those skilled in these arts, can be modified in numerous ways within the spirit and scope of the invention; the invention being measured by the appended claims and not by the details of the specification.

DESCRIPTION OF AN EXEMPLARY EMBODIMENT

Figure 1:
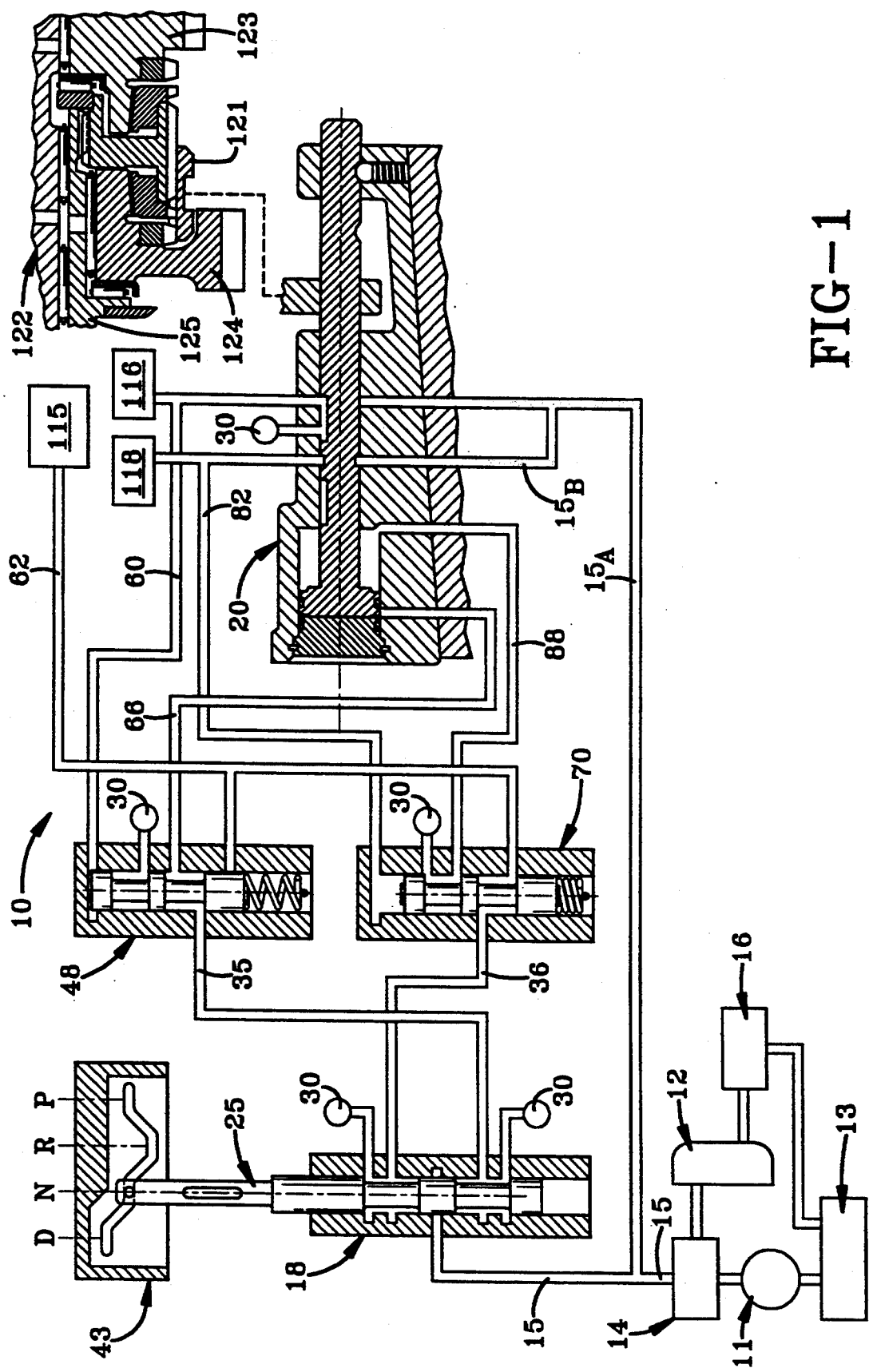
FIG. 1 is a diagrammatic representation of a transmission control incorporating the present invention, the control being depicted in the neutral condition.

One representative form of transmission shift fork control embodying the concepts of the present invention is designated generally by the numeral 10 on the accompanying drawings. The representative transmission shift fork control 10 includes a hydraulic power source such as a pump 11 that may be driven by an engine (not shown) through a conventional torque converter and power transmission assembly identified generally by the numeral 12. A countershaft type transmission such as that shown in U.S. Pat. No. 5,009,116 may be driven by the torque converter in a conventional manner. The pump 11 delivers fluid from a reservoir 13 to a conventional regulator valve 14 which establishes the maximum fluid pressure in the main feed conduit 15. After the pressure requirement in main feed conduit 15 is established, the excess fluid is directed to the torque converter and power transmission assembly 12 as well as a conventional lubrication system 16. The main feed conduit 15 is in fluid communication with a manual, range selector valve 18 and a shift fork controller 20.

The manual valve 18 has a single valve bore 21 formed in the body of a conventional valve housing, 22. A manually-operated spool valve member 25 is slidably received in the valve bore 21 for axial translation. The valve bore 21 is in fluid communication with the main feed conduit 15 through feed port 26. The valve bore 21 also communicates—through axially spaced, first and second discharge ports 28 and 29—with the fluid return system 30 that directs the fluid back to the reservoir 13. The discharge ports 28 and 29 are connected to the return system 30 through first and second discharge conduits 31 and 32, respectively. Axially spaced, forward and reverse outlet ports 33 and 34 also penetrate the body of the valve housing 22 to supply pressurized fluid to the forward and reverse supply conduits 35 and 36, respectively. The spool valve member 25 has three spaced lands 38, 39 and 40 which define first and second sub-chambers 41 and 42 therebetween. The sub-chambers 41 and 42 control fluid communication, generally as follows: between the main feed conduit 15 and the forward and reverse supply conduits 35 and 36; between the forward supply conduit 35 and the return system 30; and, between the reverse supply conduit 36 and the return system 30. The spool valve member 25 is manually moveable from the neutral position "N" depicted in FIGS. 1 and 2 to: a forward drive position "D" (FIGS. 3 and 3A), a reverse position "R" (FIGS. 4 and 4A) and a park position "P" (FIG. 5) by virtue of the interaction of the profile of a linearly movable cam member 43 that interacts with an engaging pin 44 that extends outwardly from the spool valve member 25. The cam profile includes four dwell portions $45_A$, $45_B$, $45_C$ and $45_D$ that are interconnected by ramps $46_A$, $46_B$ and $46_C$ respectively.

In the neutral position N (depicted in FIGS. 1 and 2) the engaging pin 44 reposes in dwell $45_B$, and the port 26 to the main feed conduit 15 is closed by the land 39. On the other hand, the forward supply conduit 35 is connected with the exhaust system 30 through the first sub-chamber 41 which communicates with ports 33 and 29 when the spool valve member 25 is in the neutral condition. In the neutral condition the reverse supply conduit 36 is also connected with the return system 30, but through the second sub-chamber 42 which communicates with ports 34 and 28 in that condition. It is important to know, as will be hereinafter more fully explained, that the torque transfer control solenoids 115 are in continuous communication with the return system 30 when the manual valve 18 is in either the neutral or the park conditions, respectively.

In the forward drive position D (depicted in FIGS. 3 and 3A) the engaging pin 44 reposes in dwell $45_A$. It should be apparent from the drawings that the ramp $46_A$ forces the pin 44 to translate the spool valve member 25 when the linearly movable cam member 43 is moved from the neutral position depicted in FIGS. 1 and 2 to the drive position depicted in FIGS. 3 and 3A. With the spool valve member 25 thus axially translated to the forward drive condition, the main feed conduit 15 is connected with the first sub-chamber 41 through port 26 in order to communicate with the forward supply conduit 35 through the port 33. However, the reverse supply conduit 36 remains in communication with the second sub-chamber 42 through port 34, and the sub-chamber 42 also continues to communicate, through port 28, with the return system 30.

In the reverse position R (depicted in FIGS. 4 and 4A) the engaging pin 44 reposes in dwell $45_C$. It should be apparent from the drawings that the ramp $46_B$ forces the pin 44 to translate the spool valve member 25 when the linearly movable cam member 43 is moved from the neutral condition depicted in FIGS. 1 and 2 to the reverse condition depicted in FIGS. 4 and 4A. In the reverse condition the main feed conduit 15 is connected, through port 26, to the second sub-chamber 42 in order to communicate, through port 34, with the reverse supply conduit 36. However, the forward supply conduit 35 communicates with the return system 30 through the first sub-chamber 41.

In the park position P (depicted in FIG. 5) the engaging pin 44 reposes in dwell $45_D$. It should be apparent from the drawings that the ramp $46_C$ forces the pin 44 to translate the spool valve member 25 when the linearly movable cam member 43 is moved from the reverse condition depicted in FIGS. 4 and 4A to the park condition depicted in FIG. 5. In the park condition, the spool valve member 25 is disposed in exactly the same position as described in with respect to the neutral condition depicted in FIGS. 1 and 2. This occurs inasmuch as the dwell $45_D$ is linearly aligned with dwell $45_B$.

The movements necessary to effect the conditions of the manual valve spool member 25 previously described can be readily established by the linear moveable cam member 43 having the described profile. However, other cam designs are also possible; for example, a rotary cam can be used with equal facility.

It is also possible to utilize one or more conventional half lands (not shown) on the spool valve member 25 which could close the main feed conduit 15 while the reverse supply conduit 36 would be connected with the return system 30 through an interior passage in the spool valve member 25. With this arrangement, the cam could be eliminated, and the valve spool would not need to return to the neutral condition when the park condition is selected. Those skilled in the art will appreciate the many ways possible to port the hydraulic fluid through a manual valve during the various drive selections.

The forward supply conduit 35 is connected between the forward outlet port 33 in the manual valve 18 and an inlet port 47 in the forward flow control valve 48. The forward flow control valve 48 includes a single diameter valve bore 49 formed in the body of the valve housing 22, and the inlet port 47 opens into the valve bore 49. It should be understood that whereas the housing body for the manual valve 18 may also include the forward flow control valve 48, as described, it is possible to employ a separate housing body for the valve 48. In either situation, a spool valve member 50 is slidably received in the bore 49 of the forward flow control valve 48.

A compression spring 51 biasingly urges the spool valve member 50 toward the wall 52 at that end of the bore 49 opposite the compression spring 51. The spool valve member 50 has three, axially spaced lands 53, 54 and 55 which cooperate with the bore 49 to define first and second sub-chambers 56 and 58 between the lands whereby to direct, and control, the flow of hydraulic fluid through the forward flow control valve 48. The land 53 is abutted by the compression spring 51, and the land 53 closes one end of the bore 49. The land 55 cooperates with end wall 52 to form a control sub-chamber 59 therebetween which is disposed in fluid communication with a forward signal passage 60 through a forward signal port 61.

Figure 2:
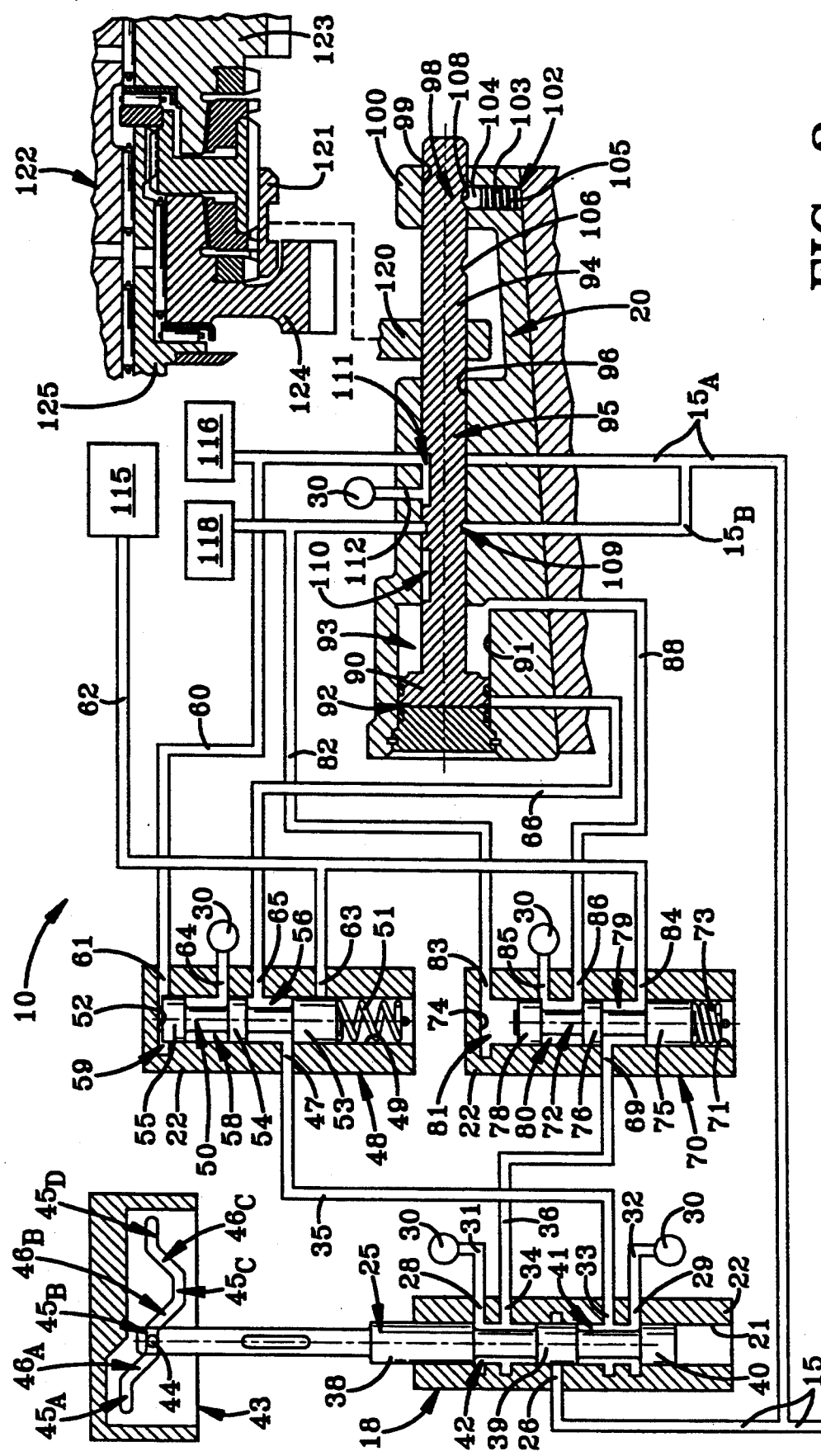
FIG. 2 is an enlarged area of FIG. 1 to focus more clearly on the fluid-operated:manual valve and the shift fork controller with the flow control valves interposed therebetween, as used to accomplish the objects of the invention.
Figure 3:
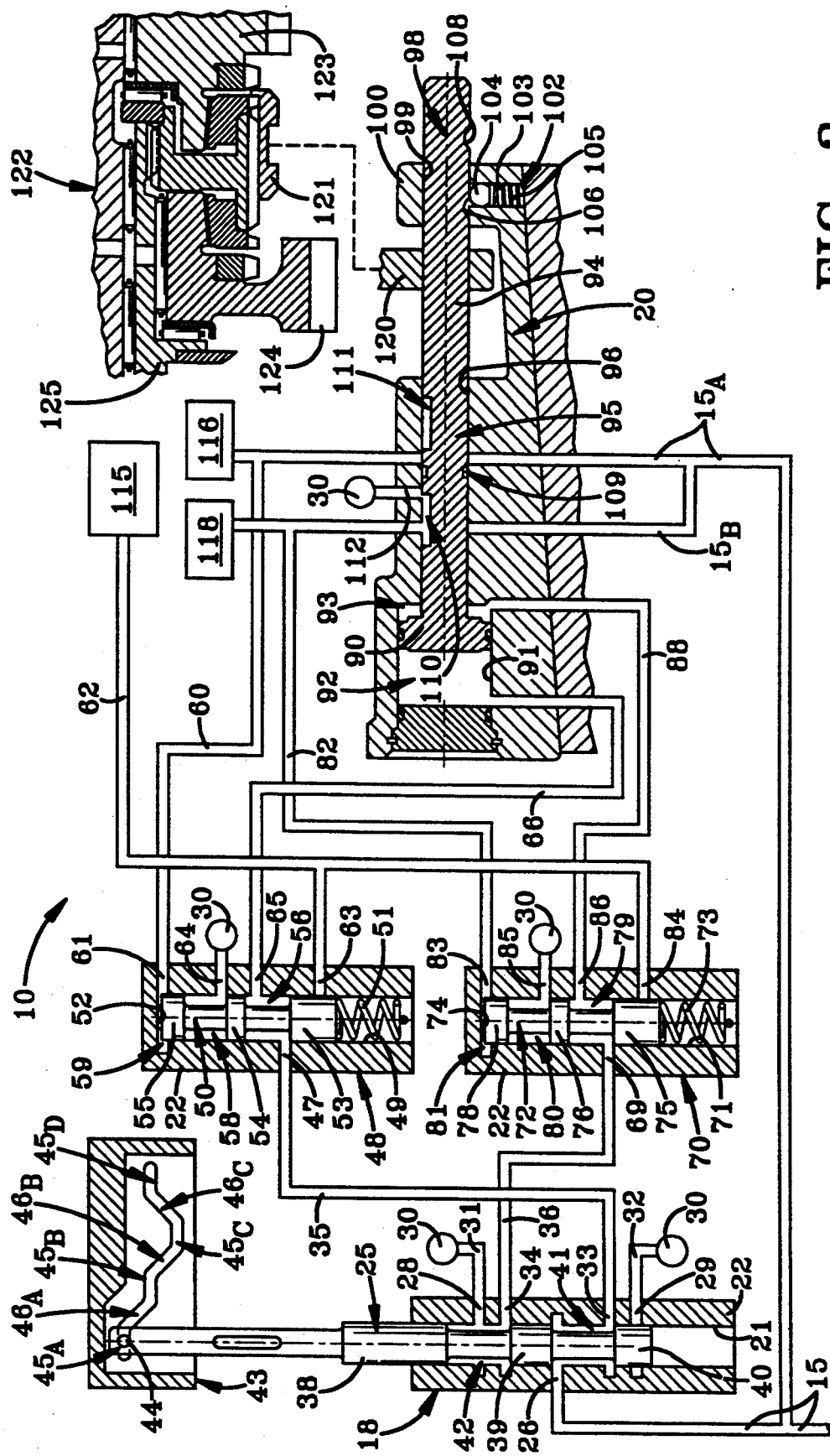
FIG. 3 is a view similar to FIG. 2, but with the components depicted as being in the process of being displaced toward the forward drive hold condition.

The bore 49 is also in fluid communication with: a solenoid feed passage 62, through discharge port 63; the return system 30, through return port 64; and, through output port 65, to a forward fork actuation passage 66. In the spring-set position, that is with the spool valve member 50 abutting the end wall 52 (as shown in FIGS. 1-3), the passage 35 is connected, through the first sub-chamber 56, with the forward fork actuation passage 66, and the solenoid feed passage 62 is closed by virtue of the land 53 blocking port 63. When, as will be hereinafter more fully described, the pressure in the control chamber 59 in the forward flow control valve member 48 is sufficient to move the spool valve member 50 against the biasing action of the compression spring 51, the spool valve member 50 will move to the pressure-set position depicted in FIG. 3A. In this position, the forward feed conduit 35 is connected, through the first sub-chamber 56, with the solenoid feed passage 62, and the forward fork actuation passage 66 is connected to the return system 30 through the second sub-chamber 58.

The reverse supply conduit 36 is connected between the reverse outlet port 34 in the manual valve 18 and an inlet port 69 in the reverse flow control valve 70. The reverse flow control valve 70 includes a single diameter valve bore 71 formed in the body of the valve housing 22, and the inlet port 69 opens into the valve bore 71. Here, too, the valve housing may, as described, be common to the housing utilized by the manual valve 18 and the housing utilized by the forward flow control valve 48, or the housing of the flow control valve 70 may be a separate unit. In either event, a spool valve member 72 is slidably received within the valve bore 71 for axial translation.

A compression spring 73 biasingly urges the spool valve member 72 toward the wall 74 at that end of the bore 71 opposite the spring 73. The spool valve member 72 also has three, axially spaced lands 75, 76 and 78 which cooperate with the bore 71 to define first and second sub-chambers 79 and 80 between the lands whereby to direct, and control, the flow of hydraulic fluid through the reverse flow control valve 70. The land 75 is abutted by the compression spring 73, and the land 75 closes one end of the bore 71. The land 78 cooperates with the end wall 74 to form a control sub-chamber 81 therebetween which is in fluid communication with a reverse signal passage 82 through a reverse signal port 83.

Figure 4:
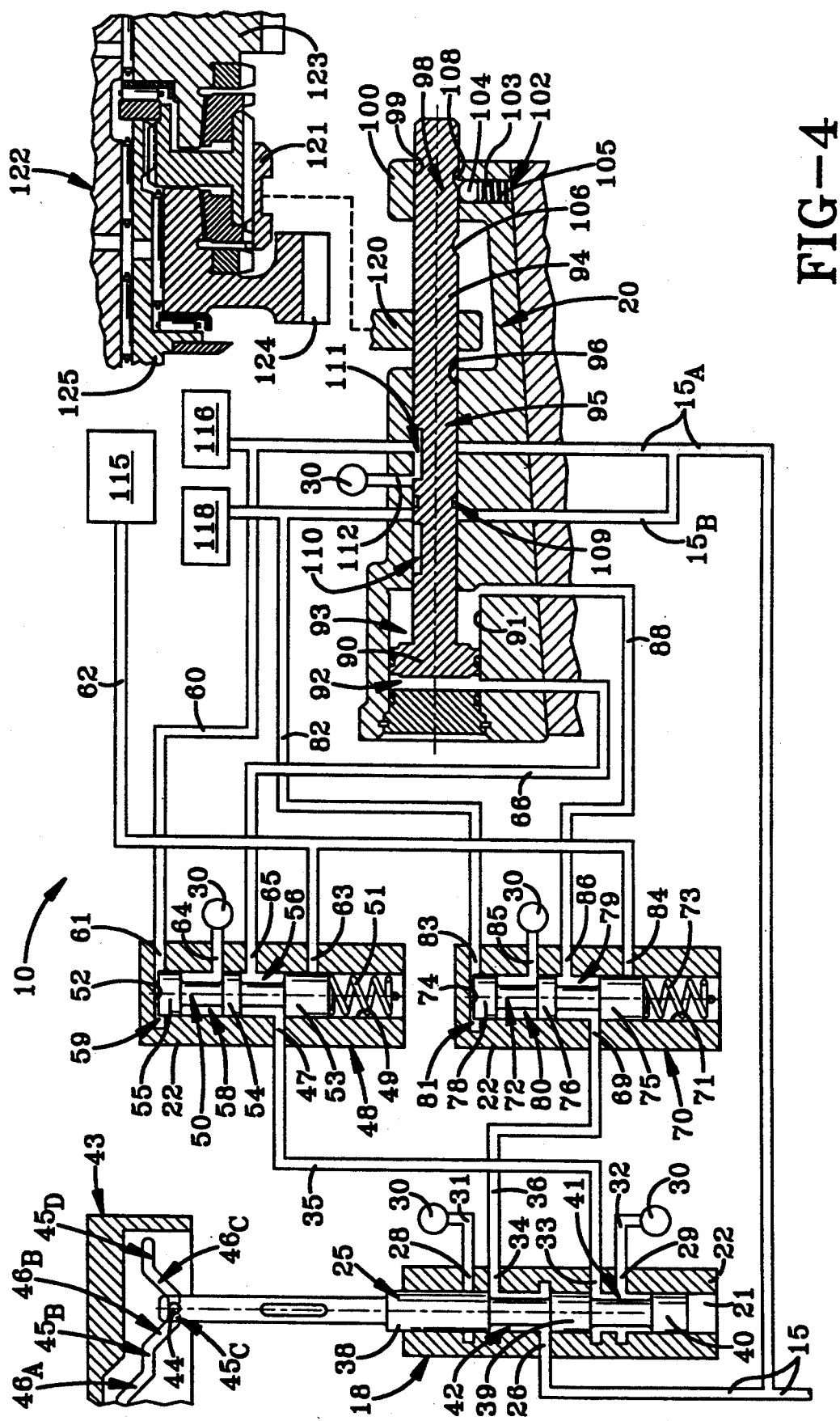
FIG. 4 is a view similar to FIG. 3, but with the components depicted as being in the process of being displaced toward the reverse drive hold condition.

The bore 71 is also in fluid communication with: the solenoid feed passage 62 through discharge port 84; the return system 30 through return port 85; and, through output port 86, to a reverse fork actuation passage 88. In the spring-set position, that is with the spool valve member 72 abutting the end wall 74 (as shown in FIG. 4), the reverse supply conduit 36 is connected, through the first sub-chamber 79, with the reverse fork actuation passage 88. In that position of the spool valve member 72 the discharge port 84, which opens to the solenoid feed passage 62, is closed by the land 75. When, as will be hereinafter more fully described, fluid pressure in the control sub-chamber 81 in the reverse flow control valve 70 is sufficient to move the spool valve member 72 against the biasing action of the compression spring 73, the spool valve member 72 will move to the pressure-set position depicted in FIG. 4A. In this position the reverse supply conduit 36 communicates, through the first sub-chamber 79, with the solenoid feed passage 62, and the reverse fork actuation passage 88 communicates with the return system 30 through the second sub-chamber 80.

It should be appreciated from the discussion of the manual valve 18, that the forward supply conduit 35 is pressurized when the manual valve 18 is in the forward drive condition, and the reverse supply conduit 36 is pressurized when the manual valve 18 is in the reverse condition (FIG. 4). Accordingly, the forward fork actuation passage 66 will be pressurized as soon as the manual valve is moved to the drive condition (FIG. 3), and the forward flow control valve 48 is in the spring-set position. On the other hand, the reverse fork actuation passage 88 is pressurized as soon as the manual valve 18 is moved to the reverse drive condition (FIG. 4), and the reverse flow control valve 70 is in the spring-set position. The pressure in fork actuation passages 66 and 88 are effective to move a piston 90 of the shift fork controller mechanism 20 to the forward and reverse positions, as required to effect the drive range selected by the operator.

Figure 3A:
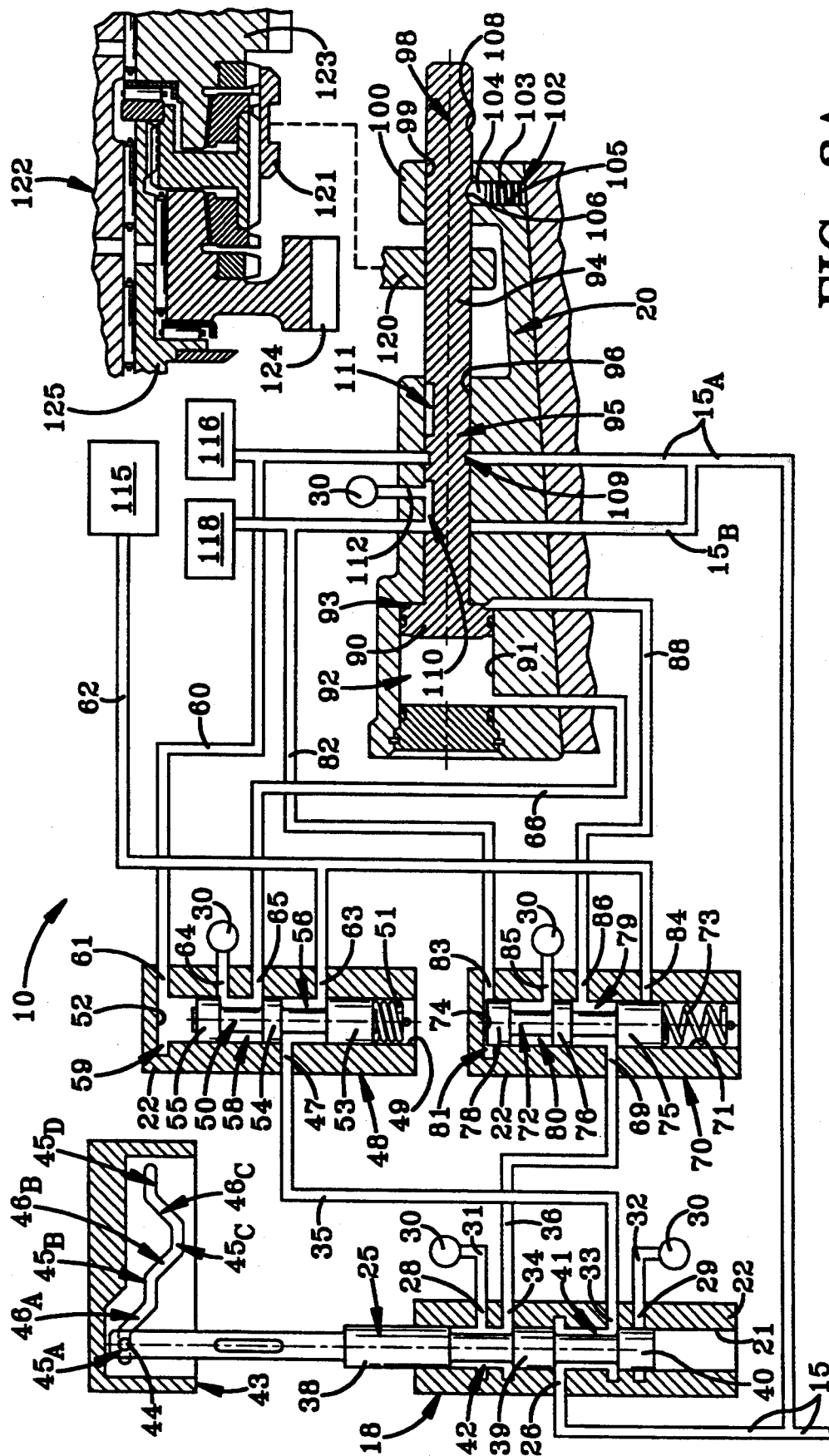
FIG. 3A is a view similar to FIG. 3, but with the components disposed in the forward drive hold condition.
Figure 4A:
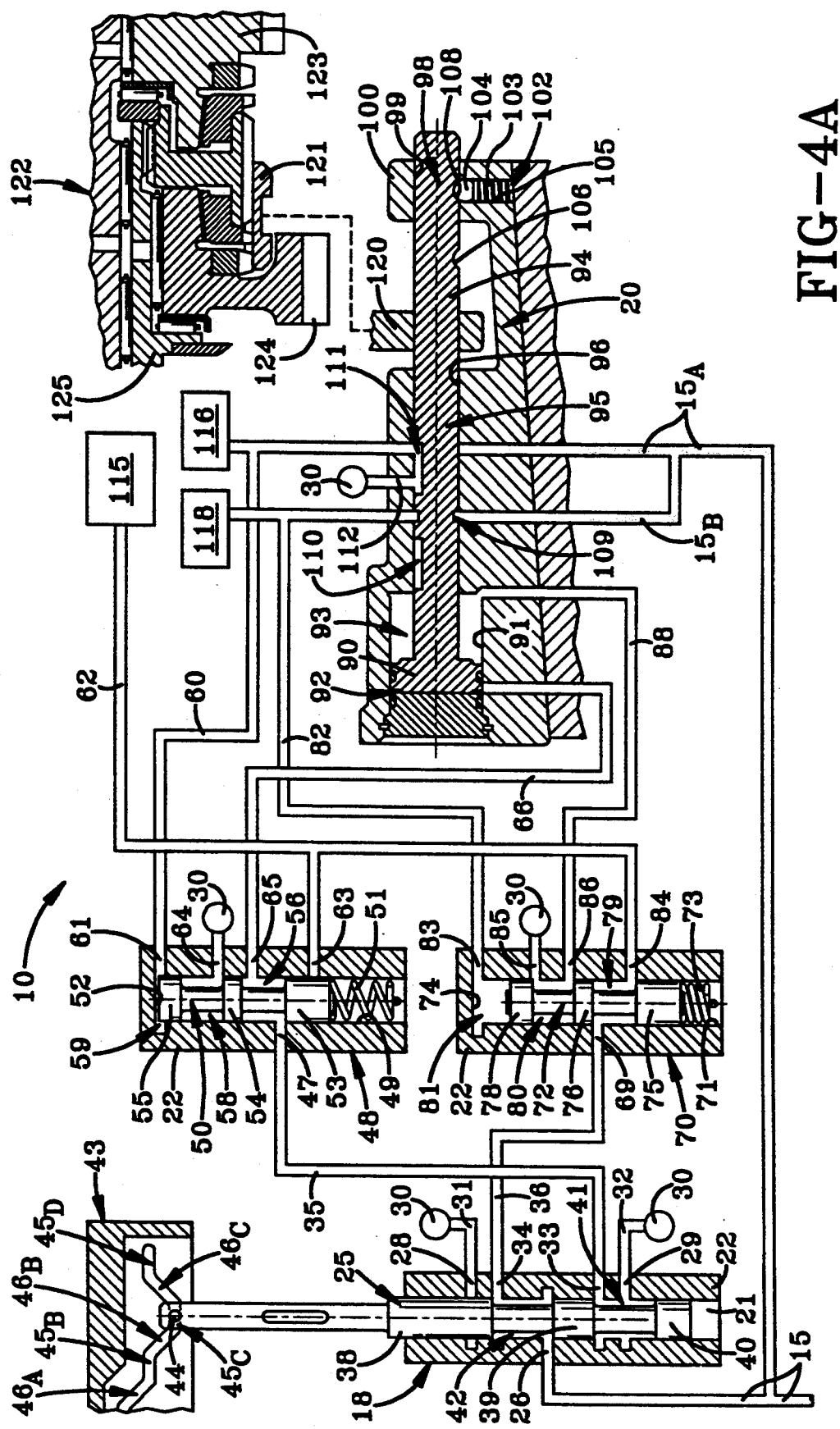
FIG. 4A is a view similar to FIG. 4, but with the components disposed in the reverse drive hold condition.
Figure 5:
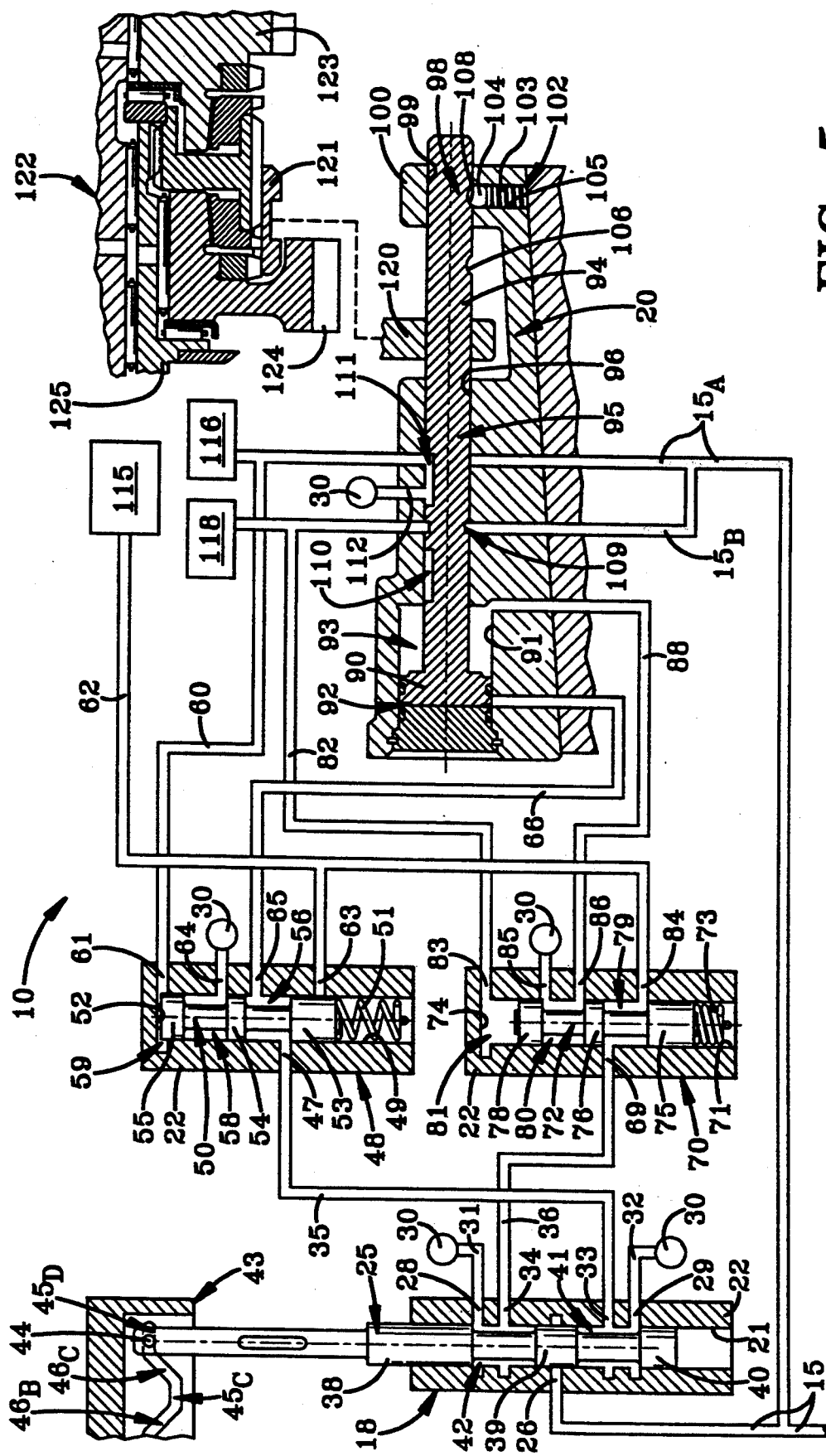
FIG. 5 is a view similar to FIG. 2, but with the control depicted in the park condition.

The piston 90 in the shift fork controller mechanism 20 is slidably disposed in a bore 91 which is divided into a forward chamber 92 and a reverse chamber 93 by the piston 90. The forward chamber 92 is connected with the forward fork actuation passage 66, and the reverse chamber 93 is connected with the reverse fork actuator passage 88. The piston 90 is secured to, or is otherwise integral with, a rod-like control rail 94 which has a valve portion 95 slidably disposed in a valve bore 96 and a notched portion 98 disposed in a bore 99 provided in a support stanchion 100. A detent assembly 102 comprised of a spring 103 and a ball 104 is disposed within the detent bore 105 that radially intersects the support bore 99. The ball 104 is urged into engagement with notches 106 and 108 when they are selectively aligned with the detent assembly 102. The detent assembly 102 cooperates to hold the control rod 94 in a forward drive position when the ball 104 engages the forward notch 106, as shown in FIG. 3A, and in a reverse drive position when the ball 104 engages the reverse notch 108, as shown in FIG. 4A. The control rail 94 is initially placed in the forward or reverse position by fluid pressure in the forward chamber 92 or the reverse chamber 93, respectively. Inasmuch as no actuating hydraulic fluid is directly forwarded to the torque transfer control solenoids 115 from the controller 20, the position of the control rail 94 in the neutral and/or the park condition is of no importance.

The valve portion 95 of the control rail 94 is provided with an annular feed chamber 109 and a pair of axially spaced, and axially extending, communication recesses 110 and 111. As shown in FIG. 3, the communication recess 110 initiates communication between the reverse signal passage 82 and the return system 30, even before the annular feed chamber 109 is disposed to connect offset 15$_A$ of the main feed conduit 15 with the forward signal passage 60 through port 112. By the time the valve portion 95 on the control rail 94 is disposed in the position represented in FIG. 3A, the annular feed chamber 109 effects a direct connection between the first offset 15$_A$ and the forward signal passage 60 while the exhaust port 112 continues to connect the reverse signal passage 82 with the return system 30 by virtue of the communication recess 110.

Thus, when the manual valve 18 is moved to the forward drive condition depicted in FIG. 3 the pressurized hydraulic fluid passing through the forward supply conduit 35 and the sub-chamber 56 in the forward flow control valve 48 to pressurize the forward chamber 92 in the controller 20, through forward fork actuation passage 66 to move to piston 90 from the position depicted in FIGS. 1 and 2 through the position depicted in FIG. 3 to the position depicted in FIG. 3A.

After the piston 90 in the shift fork controller 20 has been translated to select the forward drive range, and the control rail is secured in that position by engagement of the detent ball 104 in the forward notch 106, main line fluid pressure in the offset passage 15$_A$ is presented through the forward signal passage 60 to the control sub-chamber 59 in the forward flow control valve 48 to urge the spool valve member 50 to the pressure-set condition depicted in FIG. 3A. In this position, the forward flow control valve 48 is disposed to exhaust the fluid in the forward chamber 92 of the controller 20 to the return system 30 through the forward fork actuation passage 66 and the sub-chamber 58 in the forward flow control valve 48. When the forward flow control valve 48 is so disposed, the shift fork controller 20 is maintained in the forward drive position not only by the interaction of the detent assembly 102 with the forward notch 106 on the control rail 94 but also, as is well known, by the synchronizer mechanism itself. Moreover, in the pressure-set condition of the forward flow control valve 48 (FIG. 3A) fluid pressure is directed from the forward feed conduit 35 through sub-chamber 56 to the torque transfer control solenoids 115 which are activated to engage a conventional torque transmitting friction device, not shown, appropriate for the drive range selected. The actuating pressure for the forward drive range can be directed to the torque transfer control solenoids 115 only if the shift fork controller mechanism 20 is in the forward position. Thus, there is a delay between the time that the pressurized fluid delivered by the manual valve 18 to position the controller 20—i.e.: through the forward supply conduit 35, the forward flow control valve 48 and the forward fork actuating passage 66 to the forward chamber 92 in the shift fork controller 20—and the time the pressurized fluid effects the signal to the torque transfer control solenoids 115—i.e.: by pressurizing the control chamber 59 in the forward flow control valve 48—which permit the controlled engagement of the torque transfer friction devices in the transmission 12 by applying pressurized fluid to flow through the sub-chamber 56 in the flow control valve 48 to the torque transfer control solenoids 115.

When the manual valve 18 is moved to the reverse condition, as shown in FIG. 4, the forward supply conduit 35 is exhausted through sub-chamber 41, and the reverse supply conduit 36 is pressurized through sub-chamber 42. The pressure in the reverse supply conduit 36 is directed, via the reverse flow control valve 70, to the reverse sub-chamber 93 to overcome engagement of the detent assembly 102 with the forward notch 106 and translate the shift fork control rail 94 through the position depicted in FIG. 4 to the reverse position depicted in FIG. 4A.

Even as the control rail 94 is moved toward the reverse position, the forward signal passage 60 will be exhausted to the return system 30 through an exhaust port 112 which now communicates with the second communication recess 111, as represented in FIG. 4. However, when the control rail 94 is moved into the full reverse position (FIG. 4A) fluid from the further offset branch 15$_B$ is permitted to flow through the annular feed chamber 109 and into the reverse signal passage 82. The fluid pressure in the reverse signal passage 82 will pressurize the control chamber 81 in the reverse flow control valve 70 to urge the spool valve member 72 to the pressure-set condition depicted in FIG. 4A, thereby permitting pressurized fluid to flow through chamber 79 in the flow control valve 70 and into the solenoid feed passage 62 so that pressure is available in the torque transfer control solenoids 115 to engage the torque transfer friction device appropriate to effect reverse drive.

It is extremely important to recognize that in whatever position the controller 20 was prior to movement of the manual valve 18 to the neutral condition, one of the flow control valves 48 or 70 will be in the spring-set condition and the other of the flow control valves 70 or 48 will be in the pressure-set condition. This is important in order to assure that the torque transfer control solenoids 115 will be in continuous communication with the return system 30 whenever the manual valve 18 is in either of those positions when the engine is running and the pump 11 is operating.

Hence, when the manual valve 18 is moved from the forward drive hold condition (FIG. 3A) to the neutral condition, that branch 15$_A$ of the main line feed conduit 15 which communicates directly with the controller 26 will continue to feed pressurized fluid through the forward signal passage 60 to maintain the forward flow control valve 48 in the pressure-set condition depicted in FIG. 3A so that as soon as the manual valve 18 is moved to the neutral condition the pressurized fluid within the torque transfer control solenoids 115 will exhaust through the sub-chamber 56 in the forward flow control valve 48 and through the sub-chamber 41 in the manual valve 18 to the return system 30.

Similarly, were the manual valve 18 to be moved from the reverse drive condition (FIG. 4A) to the neutral condition, the further offset branch 15$_B$ (from the first offset branch 15$_A$ of the main feed conduit 15) which communicates directly with the controller 20 will continue to feed pressurized fluid through the reverse signal passage 82 to maintain the reverse flow control valve 70 in the pressure-set condition depicted in FIG. 4A so that as soon as the manual valve 18 is moved to the neutral condition from the reverse drive condition, the pressurized actuating fluid within the torque transfer control solenoids 115 will exhaust through the sub-chamber 79 in the flow control valve 70 and through the sub-chamber 42 in the manual valve 18 to the return system 30.

Hence, irrespective of the position of the controller 20 prior to movement of the manual valve 18 to the neutral condition, one or the other of the flow control valves 48 or 70 will assure that the torque transfer control solenoids 115 do not retain pressurized fluid for actuating either the forward or reverse gears in the transmission.

During the movement of the manual valve 18 from the forward drive condition to the reverse drive condition, the spool valve member 25 must pass through the neutral condition. As previously explained, in the neutral condition both passages 35 and 36 are exhausted. Depending on the position of the controller the solenoid feed passage 62 will also be exhausted through one or the other of the flow control valves 48 or 70, also as previously explained. This permits the release of the torque transfer friction devices in the transmission 12 such that no torque will be transmitted in neutral.

A shift to the park condition from the neutral condition requires that the manual valve 18 pass through the reverse condition. In prior art mechanisms this maneuver makes it possible to effect at least partial engagement with the reverse drive—thereby imposing some torque on the drive train. This torquing of the drive train can effect sufficient rotation of the shafting in the transmission to cause the park mechanism to ratchet on the park gear. This ratcheting produces a noise condition. While no damage will result to the vehicle, the driver may find the noise disconcerting. The present invention prevents the condition which causes the noise from occurring by delaying the pressure feed to the torque transfer control solenoids 115 until the shift fork controller mechanism 20 has been positioned and the reverse flow control valve 70 has been shifted. The time delay created by a structure embodying the concepts of the present invention provides the operator with sufficient time to complete the shift into the park condition with the manual valve 18 so that the park pawl will engage the park gear without pressurizing the torque transfer device which effects reverse operation of the transmission 12. Moreover, with a control embodying the present invention the completion of the park maneuver places the spool valve member 25 in the manual valve 18 in the neutral condition such that no pressurized fluid can access the torque transfer control solenoids 115, and the position of the controller 20 in either the inactive forward or reverse positions continues drainage of the torque transfer control solenoids 115.

As shown the forward signal passage 60 and reverse signal passage 82 may each be provided with pressure-sensing switches 116 and 118, respectively. These switches are used by the transmission controls to provide the proper logic to the electronic controls. One pressure switch is sufficient to provide forward-reverse logic. However, for those transmissions which require redundancy, two switches can, as shown, be used.

The control rail 94 has a control fork 120 attached thereto. The fork 120 is connected to a clutch collar 121 of a conventional synchronizer 122. The synchronizer 122 is operable in a well known manner selectively to connect the individual gears 123 and 124 in a drive relation to a shaft 125. The gears 123 and 124 are disposed in the forward drive path and reverse drive path, respectively, in the transmission 12.

It has been found that the present invention will provide a delay or interruption of approximately one-tenth (0.10 sec) seconds in the pressurizing of the torque transfer control solenoids 115. This prevents a pressure from occurring as the manual valve 18 passes quickly through the reverse condition during a drive-to-park shift maneuver. It has been found, however, that less delay in "garage shifts"—i.e.: a park-to-reverse shift—is provided, when compared to prior art controls using a pressure switch to verify shift fork position before initiating engagement of the torque transfer devices operated by the torque transfer control solenoids.

The foregoing description of the exemplary embodiment of the invention has been presented for the purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

While only a preferred embodiment of my present invention is disclosed, it is to be clearly understood that the same is susceptible to numerous changes apparent to one skilled in the art. Therefore, the scope of the present invention is not to be limited to the details shown and described but is intended to include all changes and modifications which come within the scope of the appended claims.

As should now be apparent, the present invention not only teaches that a shift fork control embodying the concepts of the present invention is not only capable of providing a desirable, noise reducing delay in the delivery of actuating fluid to the torque transfer control solenoids, but also accomplishes the other objects of the invention,

I claim:

1. A transmission shift control comprising:
a source of fluid pressure;
fluid-operated forward/reverse shift controller means connected with said source of fluid pressure;
torque transfer control solenoid means;
manual shift valve means connected with said source of fluid pressure for selecting a plurality of operating conditions including a forward drive condition, a reverse drive condition, a neutral condition and a park condition;
first flow control valve means for directing fluid from the manual shift valve means to said shift controller means for effecting a first position therein when the manual valve is in the forward drive condition;
a control chamber incorporated in said first flow control valve means;
first feedback signal passage means for directing fluid from said shift controller means to said control chamber in the first flow control valve means to establish a fluid connection between said manual valve means and said torque transfer controller solenoid means when said shift valve control means is in said first condition;
first spring means for biasing said first flow direction control valve means selectively to disconnect said torque transfer control solenoid means from said manual valve means;
second flow control valve means for directing fluid from the manual shift valve means to said shift controller means for effecting a second position therein when the manual valve is in the reverse drive condition;
a control chamber incorporated in said second flow control valve means;
second feedback signal passage means for directing fluid from said shift controller means to said control chamber in the second flow control valve means to establish a fluid connection between said manual valve means and said torque transfer control solenoid means when said shift controller means is in said second position;
second spring means for biasing said second flow control valve means selectively to disconnect said torque transfer control solenoid means from said manual valve means.

2. A transmission shift control, as set forth in claim 1, wherein said shift controller further comprises:
mechanical means to maintain said shift controller in either said first or said second position until said flow control valve means pressurizes said shift controller to effect movement to the other said position.

3. An improved transmission control means, as set forth in claim 1, wherein:
said control chamber of said first flow direction control valve means is pressurized selectively to connect fluid pressure from said manual valve means to said torque transfer control solenoid means; and,
said control chamber of said second flow control valve means is pressurized selectively to connect fluid pressure from said manual valve means to said torque transfer control solenoid means, whereby said torque transfer control solenoid means are closed by the respective flow control valve means in response to the biasing action of said respective spring means prior to pressurization of said respective control chambers.

4. An improved transmission control means, as set forth in claim 1, wherein said flow control valve means further comprises:
a forward control valve effective to delay fluid flow to the torque transfer control solenoid means when the synchronizer control mechanism is moved to a forward position; and,
a reverse control valve effective to delay fluid flow to the torque transfer control solenoid means when the synchronizer is moved to a reverse position.

5. A transmission shift control, as set forth in claim 4, wherein said shift controller further comprises:
mechanical means to maintain said shift controller in either said first or said second position until said flow control valve means pressurizes said shift controller to effect movement to the other said position.

6. An improvement for transmission controls employed in combination with a transmission having a fluid-operated forward/reverse synchronizer control mechanism, a plurality of fluid-operated torque transfer means, a manual valve for selecting a plurality of drive conditions including a park condition and torque transfer solenoid control valve means for controlling the flow of pressurized fluid to and from said torque transfer means, said improvement comprising:
flow control valve means including a positionable valve member for selectively directing pressurized fluid to said forward/reverse synchronizer controller mechanism in a first position and to said solenoid control means in a second position, and selectively pressurizable control chamber means for urging said valve member to said second position subsequent to positioning of said forward/reverse synchronizer controller mechanism.

7. A transmission shift control, as set forth in claim 6, wherein said shift controller further comprises:
mechanical means to maintain said shift controller in either said first or said second position until said flow control valve means pressurizes said shift controller to effect movement to the other said position.

8. A transmission shift control, as set forth in claim 7, wherein said mechanical means to maintain said shift controller in either said first or second position further comprises:
a detent assembly.

9. A hydraulic forward/reverse shift fork control having means selectively to position a shift fork, said means comprises:
manual, range selection valve means;
forward flow control valve means;
conduit means communicating between said range selector valve means and said forward flow control valve means;
reverse flow control valve means;
conduit means communicating between said range selector valve means and said reverse flow control valve means;
shift fork controller means;
conduit means communicating between said forward and reverse flow control means and said shift fork controller means;
conduit means selectively communicating between said torque transfer means and said forward and reverse flow control means.

10. A hydraulic forward/reverse shift fork control having means selectively to position a shift fork, as set forth in claim 9, wherein said manual range selector valve means comprises:
- a valve housing;
- a valve bore within said housing;
- a spool valve member disposed within said bore having first and second lands defining first and second sub-chambers within said housing.

11. A hydraulic forward/reverse shift fork control having means selectively to position a shift fork, as set forth in claim 10, wherein said forward flow control valve means comprises:
- a valve bore;
- a spool valve member disposed within said bore having first, second, and third lands defining first and second sub-chambers within said bore;
- a control sub chamber within said bore; and,
- spring means to bias said spool valve member within said valve bore.

12. A hydraulic forward/reverse shift fork control having means selectively to position a shift fork, as set forth in claim 11, wherein said reverse flow control valve means comprises:
- a valve bore;
- a spool valve member disposed within said bore having first, second, and third lands defining first and second sub-chambers within said bore;
- a control sub-chamber within said bore; and,
- spring means to bias said spool valve member within said valve bore.

13. A hydraulic forward/reverse shift fork control having means selectively to position a shift fork, as set forth in claim 12, wherein said shift fork controller means comprises:
- a bore defining forward and reverse chambers;
- a piston disposed within said bore;
- a notched control rail attached to said piston; and,
- detent means disposed within said bore selectively to engage said notched control rail.

14. A hydraulic forward/reverse shift fork control having means selectively to position a shift fork, as set forth in claim 13, wherein:
- said first sub-chamber of said manual control valve is in fluid communication with said forward control valve means and said second sub-chamber is in fluid communication with said reverse control valve means; and,
- both said first and second sub-chambers are in selective communication with a main fluid feed conduit.

15. A hydraulic forward/reverse shift fork control having means selectively to position a shift fork, as set forth in claim 14, wherein:
- said first sub-chamber of said forward control valve is in selective fluid communication with said forward chamber of said shift fork controller means;
- said first sub-chamber of said reverse control valve means is in selective communication with said reverse chamber of said shift fork controller means; and,
- said first sub-chambers of said forward and reverse control valve means are in selective communication with said torque transfer means.

16. A hydraulic forward/reverse shift fork control having means selectively to position a shift fork, as set forth in claim 15, wherein:
- selective translation of said manual valve means to a forward drive condition effects communication of said main fluid feed conduit with said forward control valve means, thereby effecting fluid communication between said main fluid feed conduit and said forward chamber of said shift fork controller;
- engagement of said detent means with said notched rail maintaining the position of said shift fork controller without fluid pressure in said forward chamber.

17. A hydraulic forward/reverse shift fork control having means selectively to position a shift fork, as set forth in claim 16, wherein:
- a delay on the order of about 0.1 second is imparted between translation of said notched control rail and actuation of said torque transfer means by virtue of the communication required between said flow control valves, the shift fork selector and thereafter with said torque transfer means.

18. A hydraulic forward/reverse shift fork control having means selectively to position a shift fork, as set forth in claim 16, wherein:
- said main fluid feed conduit communicates with said control sub-chamber of said forward control valve means to translate said spool valve and thereby prevent further fluid communication between said forward control valve means and said forward chamber of said shift fork controller while effecting communication between said main feed fluid conduit and said torque transfer means when said notched control rail engages said detent means.

19. A hydraulic forward/reverse shift fork control having means selectively to position a shift fork, as set forth in claim 15, wherein
- selective translation of said manual valve means to a reverse drive condition effects communication of said main fluid feed conduit with said reverse control valve means, thereby effecting fluid communication between said main fluid feed conduit and said reverse chamber of said shift fork controller;
- engagement of said detent means with said notched rail maintaining the position of said shift fork controller without fluid pressure in said reverse chamber.

20. A hydraulic forward/reverse shift fork control having means selectively to position a shift fork, as set forth in claim 19, wherein:
- said main fluid feed conduit communicates with said control sub-chamber of said reverse control valve means, thereby translating said spool valve and preventing further communication between said reverse control valve means and said reverse chamber of said shift fork controller and effecting communication between said main fluid feed conduit and said torque transfer means when said notched control rail engages said detent means.

21. A hydraulic forward/reverse shift fork control having means to selectively position a shift fork, as set forth in claim 20, wherein:
- a delay on the order of about 0.1 second is imparted between translation of said notched control rail and actuation of said torque transfer means by virtue of the communication required between said flow control valves, the shift fork selector and thereafter with said torque transfer means.

* * * * *